(12) United States Patent
Halberstadt

(10) Patent No.: US 6,504,352 B2
(45) Date of Patent: Jan. 7, 2003

(54) ON CHIP CURRENT SOURCE

(75) Inventor: Johan Christiaan Halberstadt, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/828,064

(22) Filed: Apr. 6, 2001

(65) Prior Publication Data

US 2001/0048296 A1 Dec. 6, 2001

(30) Foreign Application Priority Data

Apr. 10, 2000 (EP) .............................. 00201283

(51) Int. Cl.[7] .............................................. G05F 3/04
(52) U.S. Cl. .................. 323/312; 323/274; 323/280
(58) Field of Search ................. 323/311, 312, 323/265, 266, 273, 274, 303, 280, 349, 350

(56) References Cited

U.S. PATENT DOCUMENTS

| 5,014,178 A | 5/1991 | Balakrishnan | 363/49 |
| 5,285,369 A | 2/1994 | Balakrishnan | 363/49 |
| 5,548,205 A * | 8/1996 | Monticelli | 323/274 |
| 5,815,383 A | 9/1998 | Lei | 363/49 |

* cited by examiner

Primary Examiner—Jeffrey Sterrett
Assistant Examiner—Gary L. Laxton
(74) Attorney, Agent, or Firm—Aaron Waxler

(57) ABSTRACT

Current source comprising a MOS transistor (T1) having a first terminal (D) connected to a high voltage input (HV), a second terminal (S) providing an output current (Iout) to a current output terminal (Q), and a gate, the current source further including a bias unit (T2) connected to the high voltage input (HV) for generating a small bias current for the gate (G), the gate (G) further being connected to an output (Q1) of a voltage comparator (A1) for comparing a sensed voltage (Vsense) caused by the output current (Iout) over a voltage sensor means (Rsense) with a reference voltage and providing at said comparator output (Q1) a regulation voltage for the gate (G) based on the difference between the sensed voltage and the reference voltage, wherein the bias unit (T2) includes a transistor (T2) having a gate electrode (g) which is coupled to one of the nodes of the voltage sensor (Rsense).

3 Claims, 1 Drawing Sheet

ON CHIP CURRENT SOURCE

Figure 1:
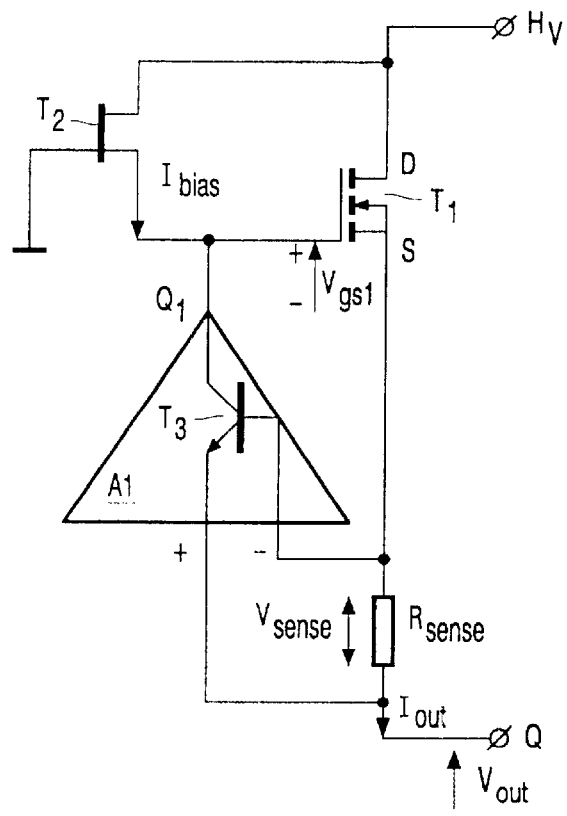

The invention relates to an on chip current source for converting a high voltage input into an output current for supplying low voltage circuitry said current source comprising a MOS transistor having a first terminal connected to a high voltage input, a second terminal in use providing an output current to a current output terminal and a gate, said current source further including bias current generating means connected to said high voltage input and arranged for generating in use a small bias current for said gate, said gate further being connected to an output of a voltage comparator means, said voltage comparator means, said voltage comparator means being arranged for comparing a sensed voltage caused by said output current over a voltage sensor means with a reference voltage and providing at said comparator output a regulation voltage for said gate based on the difference between said sensed voltage and said reference voltage.

A current source of the type described above is traditionally used as an on chip current source for supplying low voltage circuitry from a high voltage source. A drawback of those prior art current sources is their relatively low output impedance. Another drawback is that at a maximum output voltage the output current is reduced to zero.

U.S. Pat. No. 5,815,383 discloses a switchmode power supply (SMPS) high voltage start-up integrated circuit (IC) with output voltage sensing and output current limiting. The high voltage start-up IC allows low voltage pulse width modulated (PWM) controller ICs to operate directly off rectified AC lines of up to 450 VDC. The high voltage start-up IC allows PWM controller ICs to start-up with a start threshold larger than its operating voltage. The output voltage is monitored internally so that the internal high voltage switch turns off when the output voltage decreases below an internally set trip point voltage (Voff). The internal high voltage switch remains off and an external auxiliary voltage is generated and applied to the output voltage. If the output voltage falls below a lower set trip point voltage (Vreset) the internal high voltage switch turns back on. This allows the start-up circuit to reset itself when the PWM controller IC's auxiliary voltage does not power up properly.

It is, inter alia, an object of the invention to provide an improved current source for on chip use having an increased output impedance and/or an increased output voltage range as compared to the traditional circuitry. To this end, the invention provides a current source as defined in the independent claims. Advantageous embodiments are defined in the dependent claims.

These and other aspects of the invention will be apparent from and elucidated with reference to the embodiments described hereinafter.

Figure 2:
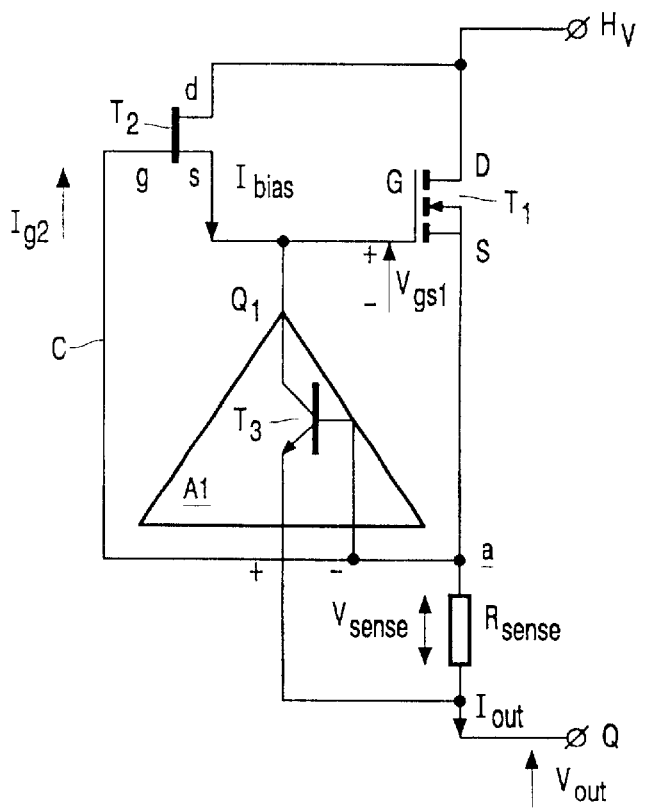

In the drawings:

FIG. 1 illustrates schematically an example of an on chip current source in accordance with the prior art; and FIG. 2 illustrates schematically by way of example an embodiment of an on chip current source in accordance with the present invention.

FIG. 1 illustrates an example of a traditional on chip current source circuit for supplying low voltage integrated circuitry from a high voltage source. A high voltage input terminal HV is connected to the drain D of a MOS transistor $T_1$. The source S of transistor $T_1$ is connected to a current output terminal that also provides an output voltage Vo. An output current Iout is provided by the source of transistor $T_1$ to the output terminal through a resistor Rsense. The high voltage input HV is further connected to the drain d of a transistor $T_2$. Transistor $T_2$ has a gate g connected to the reference voltage, on this example ground. The source of transistor $T_2$ is connected to the gate of MOS transistor $T_1$ and provides a small bias current Ibias to said gate such that the gate-source voltage of transistor $T_1$ may be increased.

A feedback control loop is provided including a voltage comparator that in operation compares the voltage over resistor Rsense with a reference voltage. In the example shown the voltage comparator is an amplifier $A_1$, and the reference voltage is the base-emitter voltage of an NPN transistor $T_3$. The output of amplifier $A_1$ regulates the gate-source voltage $V_{gs1}$ of transistor $T_1$, thereby also regulating the output current Iout.

FIG. 2 diagrammatically shows an embodiment by way of example of a current source circuit in accordance with the present invention. Though the difference between the circuit of FIG. 1 and the circuit of FIG. 2 are seemingly only minor, the results are very important indeed. The inventive circuit has a considerably increased output impedance and a considerably increased output voltage range if compared with the prior art circuit of FIG. 1.

In FIG. 2 the same reference symbols have been used as in FIG. 1 for similar features. The inventive circuit shown in FIG. 2 again has a MOS transistor $T_1$ in operation providing an output current Io via a sense resistor Rsense. Also a feedback control loop including an amplifier $A_1$ is present as well as a transistor $T_2$ providing in operation a bias current Tbias to the gate of transistor $T_1$. The circuit of FIG. 2 in fact only distinguishes from the circuit of FIG. 1 in that in the circuit of FIG. 2 the gate g of transistor $T_2$ is connected through a conductor c to node a which is the end of Rsense which is turned away from the output terminal. However, as an alternative the gate of transistor $T_2$ can be connected to the other end of Rsense that is in FIG. 2 to the output terminal Q. An attractive advantage of having the gate of transistor $T_2$ connected to node a instead of to the other end of Rsense is that in the former circuit the gate current $Ig_2$ is also measured by Rsense and thus is taken into account by the feedback control loop.

In the traditional circuit of FIG. 1, transistor $T_2$ has an output characteristic which is rather similar to a combination of a resistor and a voltage source $Vt_2$, wherein $Vt_2$ is the threshold voltage of transistor $T_2$. Fluctuations in Vout will result in fluctuation of Ibias because of the output characteristic of transistor $T_2$. Iout will then vary too. In the inventive circuit of FIG. 2 an important advantage is obtained in that Ibias does not depend from Vout as long as $Vt_2$ is constant. As a result the output impedance of the circuit is increased to a substantial extent. It is noted that this result is obtained without the use of any extra components. In connection with $Vt_2$ it is observed that in integrated circuit transistors often a parasitic MOS transistor gate is present in transistor $T_2$. Such a gate is generally called a backgate and is connected to ground. This backgate in use modulates the threshold voltage $Vt_2$.

If a parameter K is defined as the ratio of a change in threshold voltage $Vt_2$ at a given change in gate voltage $V_{g2}$, i.e. $K=dVt_2/dV_{g2}$ it can be determined by suitable calculations that the output impedance of the inventive circuit compared with the output impedance of the traditional circuit is different by said factor K. Now if K is very small other effects such as the output impedance of transistor $T_1$ will limit the actual output impedance.

Thus it follows that the output impedance of the inventive circuit is only limited by parasitic (second order) effects and therefore can be very large.

It should be noted that the above-mentioned embodiments illustrate rather than limit the invention, and that those skilled in the art will be able to design many alternative embodiments without departing from the scope of the appended claims. In the claims, any reference signs place between parentheses shall not be construed as limiting the claim. The word "comprising" does not exclude the presence of elements other than those listed in a claim. The word "a" or "an" preceding an element does not exclude the presence of a plurality of such elements.

What is claimed is:

1. Current source for on chip use for converting a high voltage input into an output current for supplying low voltage circuitry, said current source comprising:

a MOS transistor ($T_1$) having a first terminal (D) connected to a high voltage input (HV), a second terminal (S) for providing an output current (Iout) to a current output terminal (Q), and a gate (G), bias current generating means ($T_2$) connected to said high voltage input (HV) for generating a small bias current (I bias) for said gate (G), a voltage comparator means ($A_1$) for comparing a sensed voltage (Vsense) caused by said output current (Iout) over a voltage sensor (Rsense) with a reference voltage to provide at a comparator output (Q1) a regulation voltage for said gate (G) based on the difference between said sensed voltage (Vsense) and said reference voltage, characterized in that said bias current generating means includes a transistor ($T_2$) having a gate electrode (g) which is coupled to a first node of the voltage sensor (Rsense), wherein the gate electrode (g) of the bias current generating means (T2) is coupled, through no other circuit element, to a first end of the voltage sensor (Rsense) at the first node (a), and wherein a second end of the voltage sensor is directly coupled to the current output terminal (Q).

2. Current source as claimed in claim 1, characterized in that the gate electrode (g) of the bias current generating means (T2) is coupled to the current output (Q).

3. An integrated circuit characterized by a current source as claimed in claim 1.

* * * * *